(12) United States Patent
Blau

(10) Patent No.: US 9,424,242 B2
(45) Date of Patent: Aug. 23, 2016

(54) DATA CAPTURE AND ANALYSIS

(75) Inventor: M. Scott Blau, Yonkers, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 274 days.

(21) Appl. No.: 13/081,600

(22) Filed: Apr. 7, 2011

(65) Prior Publication Data

US 2011/0255107 A1 Oct. 20, 2011

Related U.S. Application Data

(60) Provisional application No. 61/324,098, filed on Apr. 14, 2010.

(51) Int. Cl.
*G06F 17/24* (2006.01)

(52) U.S. Cl.
CPC .................................. *G06F 17/243* (2013.01)

(58) Field of Classification Search
CPC .................................................. G06F 17/243
USPC .............. 358/1.11, 1.14, 1.13, 452; 710/316, 710/100, 305
See application file for complete search history.

(56) References Cited

U.S. PATENT DOCUMENTS

| 5,813,771 | A | * | 9/1998 | Ur | B41J 13/26 400/68 |
| 5,883,986 | A | * | 3/1999 | Kopec et al. | 382/310 |
| 6,047,093 | A | * | 4/2000 | Lopresti et al. | 382/310 |
| 6,594,405 | B1 | * | 7/2003 | Flannery | G06F 17/243 345/629 |
| 6,795,887 | B1 | * | 9/2004 | Cervantes | 710/316 |
| 2004/0057064 | A1 | * | 3/2004 | Stringham | 358/1.13 |
| 2005/0080756 | A1 | * | 4/2005 | Hitchcock et al. | 707/1 |
| 2008/0292191 | A1 | * | 11/2008 | Okita | H04N 1/387 382/187 |
| 2009/0232398 | A1 | * | 9/2009 | Martin et al. | 382/187 |

\* cited by examiner

*Primary Examiner* — Jacky X Zheng
(74) *Attorney, Agent, or Firm* — Farrokh Pourmirazaie; Edell, Shapiro & Finnan, LLC

(57) ABSTRACT

A computer-implemented method, system and computer program product for automated data entry performs a data recognition function on a document to recognize data from a plurality of fields including information entered by a user into at least one field, identifies at least one field that has an issue with recognized data from the field, compiles at least one correction page formatted to resolve the issue for each identified field of the document after completion of the correction page by the user, prints each correction page, and performs a data recognition function on each correction page, including information entered by the user in each field of each correction page, to resolve the issue for each identified field of the document.

18 Claims, 3 Drawing Sheets

DATA CAPTURE AND ANALYSIS

BACKGROUND

1. Technical Field

The present invention relates to the capture and analysis of data input by a user for a field-fillable form.

2. Discussion of the Related Art

Manually filled-in or field-fillable paper forms are used in many contexts to collect information. Some examples of manually field-fillable paper forms include, without limitation, survey questionnaires, tax returns, job applications, tests, etc. Data can be manually entered by a user on the paper form in multiple ways. For example, some fields to be manually filled can be simple check boxes, while some fields on the paper may require handwritten numbers or letters. The form can also have preprinted information on it that is used to identify the form itself (for example, a 1040 tax return vs. a Schedule A, an indentifier to indicate who is manually filling in the form. Etc.). Such pre-printed information can be machine-printed characters and/or a bar code format.

Once such a form is filled-in, the data on it is only available to other systems when a data entry process takes place. The most common form of data entry is manual, key-from-paper. A slightly more advanced version of this is to ascertain or key the data in one or more fields that have been manually filled by the user from an image, after the piece of paper has been digitized into a picture, such as with a document scanner. More advanced approaches to data entry automate the process known automated techniques including, without limitation, using bar code recognition, optical character recognition (OCR), Optical Mark Recognition (OMR) for check boxes, and Intelligent Character Recognition (ICR) for hand-printed characters. When automating data entry, the document image (or a "snippet" or portion of one or more individual fields or part(s) of the full form) and recognition results are typically displayed on a computer screen to a user for "verification" purposes (for example, to decide whether uncertain or unidentified characters are correct or not).

When working with a simple multi-function peripheral (MFP) device, which can be a peripheral that includes a document scanner and document printer combined into a single unit or device, it is possible to scan paper forms and to send them for manual or automated data entry. It is not possible, however, to conveniently run a "verification" step or procedure on the MFP devices built-in display, since the display on the MFP device is typically limited in size and lacks an associated keyboard, making it difficult to show a snippet and/or recognition results after analysis of the scanned document, and further lacks enough information for a user to enter changes/corrections to the document through some input device (such as a touch screen) for the MFP device. Additionally, other users may be waiting to use the MFP device while it is being used or "tied up" by someone struggling with verification. Thus, there is no easy way to use an MFP device for the complete data entry process, i.e., from scanning, through recognition, and (most importantly, from a data accuracy standpoint) verification of the recognition results.

Many MFP devices are therefore used primarily as scan devices. A document may originally be printed on the MFP device, then filled in, scanned, and the scanned image of the filled-in document is then analyzed by software that performs recognition and any verification that is needed at a later stage and possibly by someone other than the person who had manually entered information on the printed document. In addition, in some scenarios, the problem of verification is simply ignored, meaning that when there is uncertainty in the recognition results, no additional human intervention is employed, negatively impacting the accuracy of results. Thus, forms that have hand-printed or handwritten characters typically have many uncertain results that need to be addressed for high-quality data.

BRIEF SUMMARY

Accordingly, example embodiments of the present invention include a method, a computer program product and a system for computer-implemented method for automated data entry. A data recognition function is performed on a document to recognize data from a plurality of fields including information entered by a user into at least one field, at least one field is identified that has an issue with recognized data from the field, at least one correction page is compiled, where each correction page is formatted to resolve the issue for each identified field of the document after completion of the correction page by the user. Each correction page is printed, and a data recognition function is performed on each correction page, including information entered by the user in each field of each correction page, to resolve the issue for each identified field of the document.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

In accordance with embodiments of the present invention, a method, system and computer program product are provided which facilitate data capture and analysis of a document including one or more fields that contain information provided by a user.

It is to be appreciated that the embodiments of this invention as discussed below may be incorporated as a software algorithm, program or code residing in firmware and/or on computer readable medium (including software modules and browser plug-ins) having control logic for enabling execution on a computer system having a computer processor. Such a computer system typically includes memory storage configured to provide output from execution of the computer algorithm or program.

Figure 1:
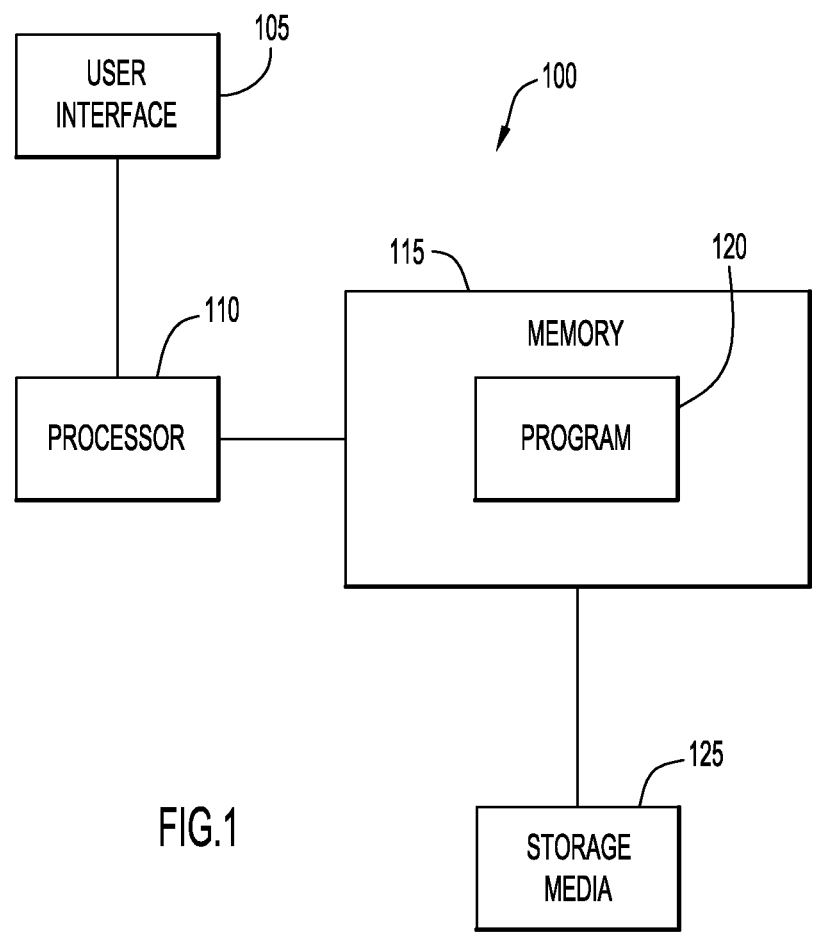
FIG. 1 is a block diagram illustrating a computer system that can be used to capture and analyze data from a scanned document including manually filled data in fields of the document in accordance with an example embodiment of the present invention.

A computer system that can be used to perform data capture and analysis from scanned documents is shown in the block diagram in FIG. 1 depicting a computer system 100. In particular, system 100 includes a user interface 105, a processor 110 (such as a digital data processor), and a memory module or memory 115. Memory 115 stores data and instructions suitable for controlling the operation of the processor 110. Example implementations of memory 115 include, without limitation, a random access memory (RAM), a hard drive and a read only memory (ROM), and/or any suitable combination of such components.

A computer software program 120 is stored in memory 115. The program 120 includes instructions for controlling the processor 110. Program 120 may be implemented as a single computer software module or as a plurality of computer software modules that operate in cooperation with one another. The program 120 is configured to facilitate performance of some or all of the method steps as set forth in the method described below and illustrated in FIG. 3.

The user interface 105 can include an input device, such as a keyboard, touch screen, tablet, API web services interface or speech recognition subsystem, for enabling a user to communicate information and command selections to the processor 110. User interface 105 also includes an output device such as a display and/or a printer mechanism such as the types that are typically included in a multifunctional device such as a Multi-Function Peripheral (MFP) device, as discussed further below. In example embodiments, the program 120 can execute entirely without user input or other commands based on programmatic or automated access to a data signal flow through other systems that may or may not require a user interface.

While the program 120 is depicted as already being loaded/stored into memory 115, alternatively the program 120 can be configured on a storage media 125 for subsequent loading into memory 115. Storage media 125 can be any conventional storage media such as a magnetic tape, an optical storage media, a compact disc, a floppy disc, or any other type of portable or other type of memory storage device. Alternatively, storage media 125 can be a random access memory, or other type of electronic storage, located on a remote storage system, such as a server that delivers the program 120 for installation and launch on a user device.

In an example embodiment, the capture and analysis of data obtained from a scanned document is implemented utilizing a MFP device, or as the combination of a MFP device linked via a network with a server or other computer system. As shown in the example embodiment of FIG. 2, a plurality of MFP devices 200 are networked via a server 210. Each MFP device 200 can include any or all of the following peripheral components: a printer component that prints electronically stored text, graphics and/or other forms of data from electronically stored documents; an image scanner or scanner component that optically scans a document and converts any printed text, handwriting, images and/or other objects disposed on the document to a digital image; a photocopier component that makes a paper copy of a document, images, text and/or any other form of electronic data; a facsimile component that transmits and receives electronic documents and/or other forms of data to and from one or more other sources; and an emailing device that transmits and receives emails to and from one or more other sources. Thus, an MFP device 200 can be configured to print, scan, fax and photocopy.

The MFP devices can be designed having any suitable sizes and configured for use in home/residential environments, small business environments, enterprise and commercial environments. The MFP devices can further be configured to provide laser printer capabilities (e.g., for commercial/enterprise environments) and/or inkjet printer capabilities (e.g., for small office/home office environments). One example of a known MFP device that can be implemented for use in accordance with the present invention is described in U.S. Pat. No. 6,795,887. Printing, scanning, faxing, photocopying and emailing features and the components required to perform such features are well known in the art of MFP devices, such that a detailed description of such components for the MFP devices 200 need not be shown.

Figure 2:
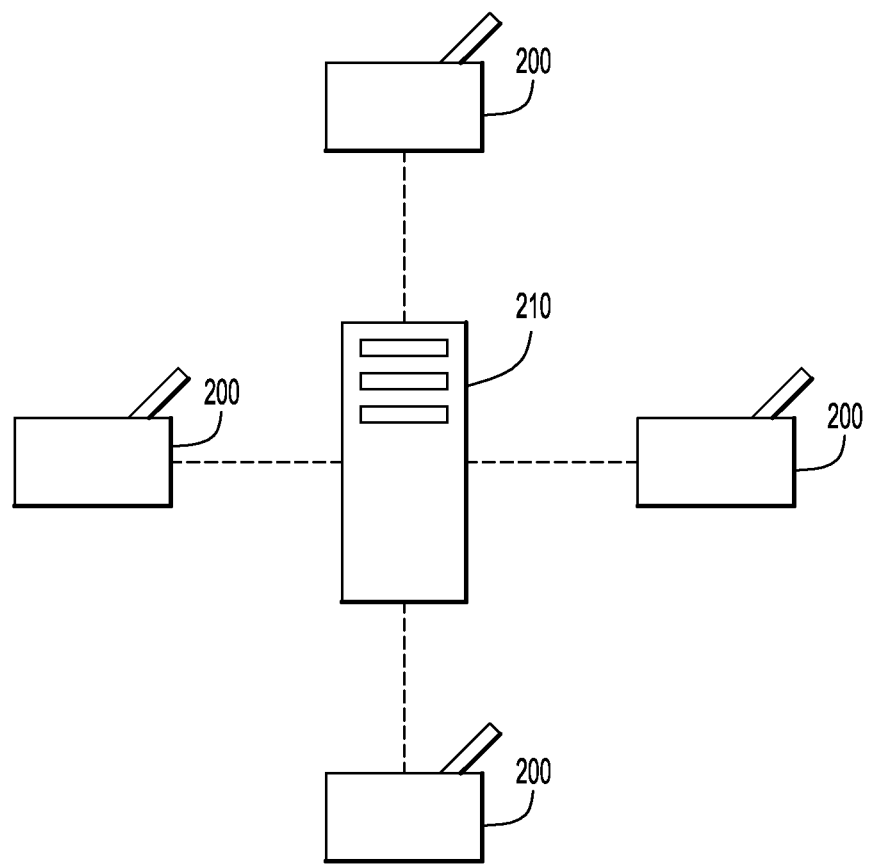
FIG. 2 is a block diagram illustrating a plurality of multi-function peripheral (MFP) devices connected in a network configuration with a server in accordance with an example embodiment of the present invention.

The computer system 100 illustrated in FIG. 1 can be implemented in each MFP device 200 shown in FIG. 2, where each MFP device 200 includes a processor 110 that processes and analyzes the captured data from a scanned document, performs any correction analysis for captured data identified as having a potential error/issue, and provides the captured and/or corrected data to the server 210 for storage (e.g., in a database management system). Alternatively, the computer system 100 of FIG. 1 can be implemented as the combination of one or more MFP devices 200 along with the server 210, where an MFP device 200 serves as the user interface 105 to perform the scanning and printing functions for documents in order to capture data, and where the server 210 includes a processor 110 to perform further processing and data analysis of the scanned document in order to determine whether there is any potential error/issue with the scanned data.

Figure 3:
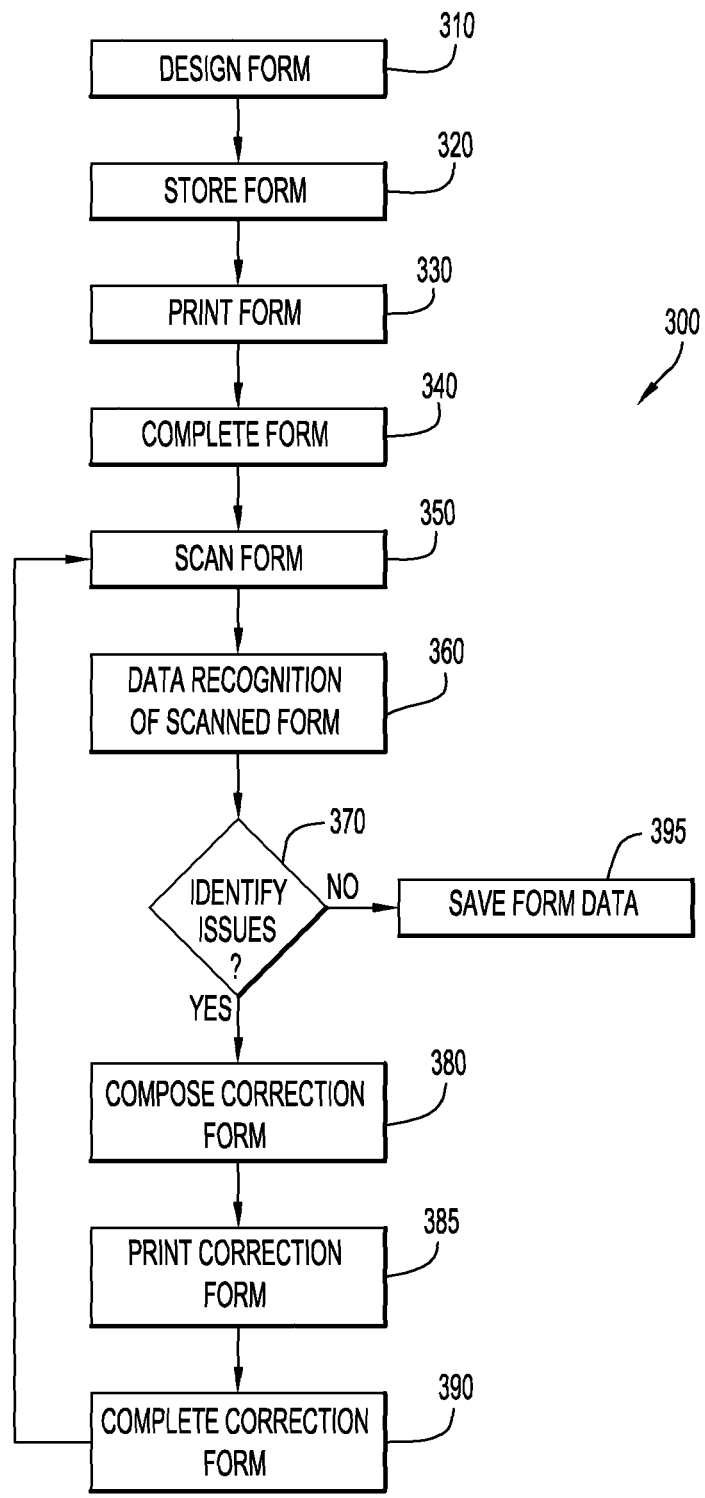
FIG. 3 is a flow chart illustrating a method of operating an MFP device in accordance with an example embodiment of the present invention.

An example method for operating one or more MFP devices 200 as shown in FIG. 2, utilizing the computer system 100 as shown in FIG. 1, is now described with reference to FIG. 3. The method 300 described herein and shown in FIG. 3 is summarized in a flow diagram for facilitating a description of the principal processes of an illustrated embodiment of the invention. However, it is noted that certain processing steps shown as blocks in FIG. 3 can be invoked in an arbitrary order, such as when the events drive the program flow such as in an object-oriented program. Accordingly, the flow diagram is to be understood as an example flow and that the blocks can be invoked in a different order than as illustrated.

In addition, the systems/devices of FIGS. 1 and 2 are intended to provide a brief, general description of an illustrative and/or suitable example environment in which processing steps such as those shown in FIG. 3 may be implemented. FIGS. 1 and 2 are examples of suitable environments and are not intended to suggest any limitation as to the structure, scope of use, or functionality of an embodiment of the present invention. A particular environment should not be interpreted as having any dependency or requirement relating to any one or combination of components illustrated in an example operating environment. For example, in certain example embodiments, one or more elements of an environment may be deemed not necessary and omitted. In other example embodiments, one or more other elements may be deemed necessary and added.

Further, certain example embodiments may be described with reference to acts and symbolic representations of operations that are performed by one or more computing devices, such as the computing system environment 100 used in an MFP device 200 and/or an MFP device 200 combined with a server 210 as shown in FIG. 2. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be described in a general context of computer-executable instructions, such as computer program modules, being executed by a computer. Generally, computer program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

As noted above, a system and process for capturing and analysis of data from a manually field-fillable document can be implemented as a software and computer driven application executing on a computer system 100 implemented in an MFP device 200 and/or a combination of MFP device 200 with server 210, enabling the MFP device 200 to be used for the full cycle of automated data entry from creation (printing) of the document (such as a form), through scanning of the manually filled-in document, and then printing out of any uncertain recognition results. The uncertain recognition results may include both image snippet and raw recognized data printed on a correction page by the MFP device 200. As will be further discussed below, this new correction page is formatted in a form that the enables the user to correct and resolve any uncertain data.

An example method 300 of operation is now described with reference to FIG. 3. At step 310, a document (e.g., a manually field-fillable form) is designed such an employment application, formatted to include pre-printed text fields requesting user entered information fields. The pre-printed text fields include information that is provided on the document when it is printed out and before information is provided by user on the document. A non-limiting example of such a document can be an employment application. Non-limiting examples of pre-printed text fields for the document are as follows:

Name _____
Date _____
Prior Experience _____

Thus, the aforesaid, "Name", "Date" and "Prior Experience" are the pre-printed text fields and the requested information designated by "_____" are the user entered information fields. This document is then preferably stored in the memory 115 of computer 100 through any known conventional mechanism, including using storage media 125 (step 320). It is to be understood that the computer 100 may store a plurality of different documents, where each document preferably includes at least one "user information field" accessible to a user, preferably via interface 105. The memory 115 of the computer can be in the MFP device 200 or, alternatively, in the server 210 that may be networked with the MFP device 200.

A user then selects a document stored in memory 115, via the user interface 105 of the MFP device 200, and prints out a desired number of copies from the MFP device 200 using a printer peripheral component of the MFP 200 device (step 330). For example, the MFP device 200 may store or have access to a plurality of different types of documents that can be selected by the user. After the desired number of selected documents are printed, each document is preferably completed by a user such that the user fills in each aforesaid "user entered information field" corresponding to a "pre-printed text field" with information (step 340). The user may provide this information via hand-written text (i.e., by writing directly on the document with a writing instrument, such as a pen or pencil) or via another printing device. It is to be appreciated that while the MFP device 200 is described above as printing the user documents, it is not be understood that the user documents may only be printed by MFP 200, as the documents may also originate from other printing devices.

After a user completes a document by filling in each indicated "user information field" corresponding to a "pre-printed text field" with information, the document is then entered into the MFP device 200 so as to be scanned using a scanning peripheral component of the MFP device 200 (step 350), where the scanned document is stored within a memory storage location (e.g., memory 115) of the MFP device 200. Once scanned, the image of the scanned document is analyzed by the processor 110, utilizing any one or more computer software modules configured to perform data recognition (step 360) to recognize or "read" data from at least the "user entered information fields" (or from both the "user entered information fields" and the "pre-printed fields") of the scanned document. Non-limiting examples of computer software-implemented methods to perform data recognition for identifying information provided by the user in the "user entered information fields" and/or information in the "pre-printed fields" include bar code recognition, optical character recognition (OCR), Optical Mark Recognition (OMR) for check boxes, and Intelligent Character Recognition (ICR) for hand-printed characters. In particular, the data recognition step converts the information provided by the user in the "user entered information fields" of the scanned document into data that can be processed and evaluated by the processor 110.

After performing data recognition of the scanned document, the processor 110 determines if there are any potential errors or issues with the data obtained from the "user entered information fields" (step 370). Non-limiting examples of potential errors or issues include incomplete information obtained from a "user entered information field" such that the processor 110 is uncertain of how to interpret the information, the data obtained from a "user entered information field" is determined as being uncertain if it fails a validation test (for example, a user entered date field is provided with an invalid value, such as Feb. 29, 2010, a user entered name field includes a name with a listing of consecutive consonants that exceeds a threshold value, etc.), data obtained from identification of a "user entered information field" does not correspond with data from a known database (for example, a data recognition value of "John Smith" in a user entered name field does not correspond with any known names in a database that corresponds with the document), etc. A non-limiting example of a potential error or issue for a "pre-printed field" may be an incorrect form has been filled out and scanned by the user for a particular operation (e.g., the user selected the incorrect form for a specific data entry scenario, where the incorrect form is identified by a "pre-printed field").

In the event the processor 110 determines that there is an issue within any "user entered information field" (e.g., a possible error or missing information) and/or any "pre-printed field" (e.g., the user is using the wrong document for a specific data entry operation) of the scanned document, a correction form is composed (step 380). The correction form can include the entire scanned document, with information regarding which "user entered information fields" and/or "pre-printed fields" have been determined as potentially having an error or an issue. Alternatively, the correction form can include a new "correction page" (or pages) that includes image portions or "snippets" of the fields of interest, the recognition results, and a new area for a user to enter how they want a correction made. For example, the correction form can be configured to include a check box for a user to indicate that the value as recognized is, indeed, correct. Or, if not, the correction form can be configured to include another information field to be filled by the user to enter the correct value (i.e., to correct the value that was previously entered incorrectly). As noted above, the processor 110 can be implemented for operation in an MFP device 200 or in the server 210, such that the correction page (or pages) is either composed by the MFP device or the server.

The composed correction form or correction page (or pages) can be configured to have pre-printed unique ID values that correlate the "correction page" (or pages) back to the original scanned document and its associated data so as to update in memory each "user information field" that was the subject of the correction page after it has been scanned by the MFP device 200. For example, a correction page can include a plurality of "user information fields" from different pages and/or in different orders of the scanned document, where such "user information fields" contain user entered information that has been determined as being possibly incorrect or having some identified issue. Each "user information field" of the correction page is associated with a unique identifier or identification (ID) value that is known to the processor 110 and that assigns such "user information field" with a corresponding "user information field" with which information has been identified with an issue (from step 370).

After the correction page has been composed, it is then printed (step 385), for example, by a printer peripheral component of the MFP device 200 being operated by the user. The user then attends to the correction page (or pages) by providing the requested information (step 390). In other words, the user manually checks boxes indicating whether certain "user information fields" already contain accurate information and, where necessary, fills in the corrected information in the "user information fields" of the correction page(s) The user then enters the correction page (or pages) by scanning the correction page(s) into the MFP device 200, repeating the aforesaid process starting at step 350. As mentioned above, each "user information field" of the correction page can be provided with a unique ID such that when the MFP device 200 scans and performs a data recognition step of each correction page, the processor 110 determines the correct page and location of a previously scanned document to which each correction page "user information field" is associated so as to correct and/or supplement the proper "user entered information fields" which were previously identified as having an issue (e.g., possible incorrect information) for a particular scanned document. The correction and/or supplementation of the information from the correction page includes, e.g., replacement and/or addition of recognized data in "user entered information fields" from a correction page with data in the corresponding "user entered information fields" of the scanned document.

Returning to step 370, when the MFP device 200 determines that each correction page and/or each scanned document by a user has no further identified issues, the collected data provided by the user for each scanned document that has been obtained by data recognition is then saved (step 395). The collected data can be saved by the MFP device 200 and/or by the server 210 in a suitable memory storage location. For example, the MFP device 200 can save and process collected data. Alternatively, the MFP device 200 can provide the collected data to the server 210 for further processing (for example, for insertion of such data into a database using a database management system).

In an example embodiment in which the scanned document is a test sheet, the processor 110 (e.g., implemented within the MFP device 200 and/or the server 210) can include grading actions (e.g., providing a test score based upon collected data obtained from the the scanned test sheet of the user and/or test sheets of other users). In another example embodiment, the MFP device 200 is configured to electronically store the recollected data from the scanned document for additionally processing by the server 210 or another computer system (for example, if the scanned document is a job application, those job applications identifying certain prior experiences may be identified by the processor 110 of MFP device 200, server 210 and/or other computer system for further consideration).

Thus, the example embodiments describe above provide a system and process that, using a MFP or other similar device, recognized and verifies data input on a scanned document by a user (e.g., using any suitable one or more types of recognition software programs including, without limitation, OMR, OCR, and ICR). Thus, scanned documents that require more complex human input, including names and addresses, can be fully processed via an interface of a MFP device (where the MFP device is a stand-alone device or networked with a server and/or some other computer system).

The systems and methods described above are adaptable for use in a wide range of scenarios including, without limitation: in a government agency, such as a motor vehicles department, wherein users fill in their documents and conduct an entirely self-service interaction, filling in license and other application documents, and making corrections; in an accounts payable department, where an invoice is scanned and recognized with problems being identified and printed out for correction prior to the data being sent to an ERP (enterprise resource planning) system; in a personnel department, in which various applications (e.g., benefit management forms, etc.) could be scanned by HR (human resource) personnel, or directly by employees, allowing them to make all the necessary corrections prior to final processing; in a hospital, where medical staff could select documents to print, complete and then scan them back to an MFP device which provides print outs of any problems that need to be resolved before the scanned documents leave the MFP device and are further processed; etc.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

As will be appreciated by one skilled in the art, aspects of the present invention may be embodied as a system, method or computer program product that includes computer software or computer readable code that is configured to perform operations in accordance with the methods described above. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The MFP device, server, computer system and any components of the computer system (e.g., memory, user interface, processor and storage media) can be any suitable computer systems implemented by any type of hardware and/or other processing circuitry, and utilizing any suitable hardware and software implemented in a single module or unit or, alternatively, implemented as two or more separate units. For example, any of the components described above can be implemented by any quantity of conventional or other computer systems or devices (e.g., computer terminals, personal computers (e.g., IBM-compatible, Apple MacIntosh, tablet, laptop, etc.), etc.), cellular telephones, personal data assistants (e.g., Palm Pre, Droid, iPhone, etc.), etc., and may include any commercially available operating system (e.g., AIX, Android, Linux, OSX, Sun Solaris, Unix, Windows, etc.) and any commercially available or custom software (e.g., browser software, communications software, word processing software, etc.). These systems may include types of displays and input devices (e.g., keyboard, mouse, voice recognition, etc.) to enter and/or view information.

Any combination of one or more computer readable medium(s) may be utilized for the previously described processor, storage media, memory, etc. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
scanning a document, via a scanning component of a multi-function peripheral device of a system;
performing a data recognition function on the document, via a processor, to facilitate identification of an issue with data within a user information field of the document;
in response to the identification, via the processor, of the issue with the data within the user information field of the document, printing a correction page to request a data correction; and
scanning the correction page, via the scanning component, to facilitate performing the data recognition function, via the processor, on the correction page, wherein:
the document includes pre-printed information located on one or more pages of the document and a plurality of user information fields that comprise manually entered data on the one or more pages of the document, and the correction page includes only the user information field to which the issue with the data has been identified as well as any additional user information field in which another issue with data has been identified such that the correction page is different from each page of the document, and
each of the user information fields of the correction page has a visible unique ID such that when the multi-function peripheral device scans and performs a data recognition function of the correction page, the processor determines a correct page and location of a previously scanned document to which each of the user information fields of the correction page is associated so as to correct a proper user information field which was previously identified as having the issue for the previously scanned document.

2. The method of claim 1, wherein the multi-function peripheral device further includes a printer component that prints the correction page, and the method further comprises:
in response to a selection of the document from a plurality of documents, printing the document to facilitate data entry to the field of the document.

3. The method of claim 1, further comprising:
performing, via the processor, the data recognition function on the correction page, including recognition of handwritten data manually entered on the correction page, to resolve the identified issue with the data within the user information field of the document, wherein the data recognition function comprises at least one of optical character recognition, optical mark recognition, and intelligent character recognition.

4. The method of claim 3, further comprising:
saving the recognized data from the correction page.

5. The method of claim 1, wherein the correction page includes only a portion of content within the document, the portion comprising each user information field having an identified issue.

6. A system for automated data entry, the system comprising:
a scanner to scan a document via a scanning component of a multi-function peripheral device of the system;
a printer to print documents; and
a processor configured with logic to:
perform a data recognition function on the scanned document to facilitate identification of an issue with data within a user information field of the document,
in response to the identification of the issue with the data within the user information field of the document, facilitate printing by the printer of a correction page to request a data correction, and
scanning the correction page, via the scanning component, to facilitate performing the data recognition function on the correction page, wherein:
the document includes pre-printed information located on one or more pages of the document and a plurality of user information fields that comprise manually entered data on the one or more pages of the document, and the correction page includes only the user information field to which the issue with the data has been identified as well as any additional field in which another issue with data has been identified such that the correction page is different from each page of the document, and
each of the user information fields of the correction page has a visible unique ID such that when the multi-function peripheral device scans and performs a data recognition function of the correction page, the processor determines a correct page and location of a previously scanned document to which each of the user information fields of the correction page is associated so as to correct a proper user information field which was previously identified as having the issue for the previously scanned document.

7. The system of claim 6, wherein the processor is further configured to:
perform the data recognition function on the correction page, including recognition of handwritten data manually entered on the correction page, to resolve the identified issue with the data within the user information field of the document, wherein the data recognition function comprises at least one of optical character recognition, optical mark recognition, and intelligent character recognition.

8. The system of claim 7, further comprising:
a memory storage location that stores the recognized data from the correction page.

9. The system of claim 7, wherein the multi-function peripheral device includes the processor and the printer, and the system further comprises a server connected with the multi-function peripheral device, wherein the multi-function peripheral device provides the recognized data from the correction page to the server.

10. The system of claim 6, wherein the multi-function peripheral device includes the printer.

11. The system of claim 10, wherein the processor facilitates printing by the printer of the document from a plurality of documents so as to facilitate data entry to the user information field of the document.

12. The system of claim 10, wherein the multi-function peripheral device includes the processor.

13. The system of claim 6, wherein the correction page includes only a portion of content within the document, the portion comprising each user information field having an identified issue.

14. A non-transitory computer readable storage device having computer readable instructions embodied therewith, when the computer readable instructions are read and executed by a processor, the processor performs a method comprising:
scanning a document, via a scanning component of a multi-function peripheral device of a system;
performing a data recognition function on the document to facilitate identification of an issue with data within a user information field of the document; and
in response to the identification of the issue with the data within the user information field of the document, printing a correction page to request a data correction, and
scanning the correction page, via the scanning component, to facilitate performing the data recognition function, via the processor, on the correction page, wherein:
the document includes pre-printed information located on one or more pages of the document and a plurality of user information fields that comprise manually entered data on the one or more pages of the document, and the correction page includes only the user information field to which the issue with the data has been identified as well as any additional user information field in which another issue with data has been identified such that the correction page is different from each page of the document, and
each of the user information fields of the correction page has a visible unique ID such that when the multi-function peripheral device scans and performs a data recognition function of the correction page, the processor determines a correct page and location of a previously scanned document to which each of the user information fields of the correction page is associated so as to correct a proper user information field which was previously identified as having the issue for the previously scanned document.

15. The non-transitory computer readable storage device of claim 14, wherein the method further comprises saving the recognized data from the correction page.

16. The non-transitory computer readable storage device of claim 14, wherein the method further comprises facilitating printing of the document from a plurality of documents so as to facilitate data entry to the field of the document.

17. The non-transitory computer readable storage device of claim 14, wherein the method further comprises:
performing the data recognition function on the correction page, including recognition of handwritten data manually entered on the correction page, to resolve the identified issue with the data within the user information field of the document, wherein the data recognition function comprises at least one of optical character recognition, optical mark recognition, and intelligent character recognition.

18. The non-transitory computer readable storage device of claim 14, wherein the correction page includes only a portion of content within the document, the portion comprising each user information field having an identified issue.

* * * * *